Figure 1:
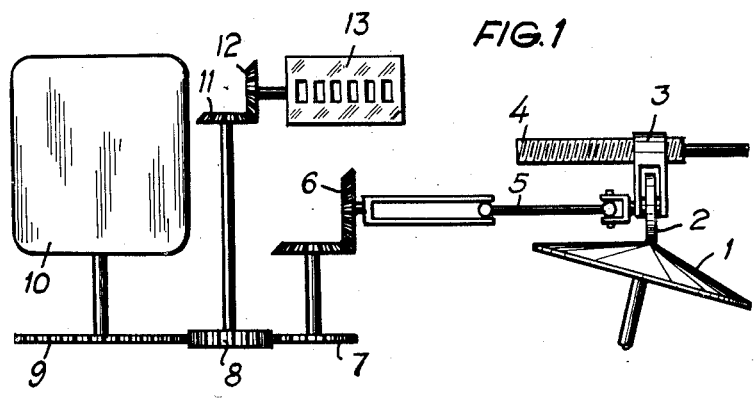

Nov. 18, 1952 E. M. ÖSTERMAN 2,618,769
SPEED REGULATION FOR INTEGRATORS FOR LOGS
Filed March 16, 1949 2 SHEETS—SHEET 2

INVENTOR:
Edvin Mauritz Österman,
BY:
Pierce, Scheffler & Parker,
Attorneys.

UNITED STATES PATENT OFFICE 2,618,769

SPEED REGULATION FOR INTEGRATORS FOR LOGS

Edvin Mauritz Österman, Stockholm, Sweden, assignor to Svenska Ackumulator Aktiebolaget Jungner, Stockholm, Sweden, a corporation of Sweden Application March 16, 1949, Serial No. 81,744
In Sweden April 10, 1948

1 Claim. (Cl. 318—321)

The invention relates to logs of the type in which the velocity is obtained as a mechanical motion, for example, a rotation of a shaft. In such logs the distance is usually obtained by means of a mechanical integrator. The integrator comprises a disc or a cone which is driven by a motor at a constant velocity and drives a roll or wheel (distance wheel), the distance of which from the center is set in proportion to the speed. Thereby the rotation of the wheel will be proportional to the distance. The rotary motion of the wheel is transmitted to a counting apparatus and possibly to a transmitting device for transmission of the distance value to other points in the ship. This transmitting device may comprise a selsyn element, a contact device or the like. In apparatus of this type hitherto used the distance wheel has a horizontal shaft as counted in the normal position of the log, whereas the counting apparatus and the transmitting device have their axis located horizontally in a direction at right angles to the outgoing shaft of the integrator. This arrangement has proved to be unnecessarily complicated and requires a great space. In order to attain a constant rotary speed of the cone or disc of the integrator, a motor having a rather great power has been employed, the speed of the motor being controlled by an escapement in such a manner that a greater or less resistance is applied to any of the circuits of the motor. Heretofore, this device has been designed in such a manner that the escapement has been provided with a contact lever which engages a number of contacts on a shaft driven by the motor. These contacts are connected by way of slip rings to a number of fixed resistances which are coupled in such a manner that if the motor runs slower than the escapement its velocity is increased and vice versa.

The present invention has for its object to simplify these arrangements substantially with a view to requiring less space and reducing the number of parts. As a first step for this purpose the shaft of the counting apparatus and suitably also that of the distance transmitting device, according to the invention, is parallel to the outgoing shaft of the integrator. In consequence it is possible to transmit the motion from the outgoing shaft of the integrator by providing only two spur gears (having totally three gear wheels only), whereas the prior device required two bevel gears and two spur gears.

According to a further development of the invention the resistances, by which the motor operating the integrator is controlled, may be mounted on a shaft driven by said motor, possibly the shaft of the integrator disc or cone. By this it is gained that only one slip ring is required at the shaft driven by the motor. Furthermore, the entire control device becomes one unit, whereby the number of details as well as the coupling work and the required space is reduced.

Figure 2:
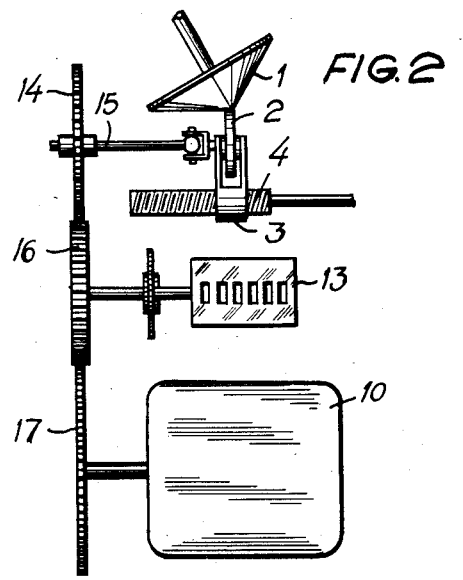
Figure 3:
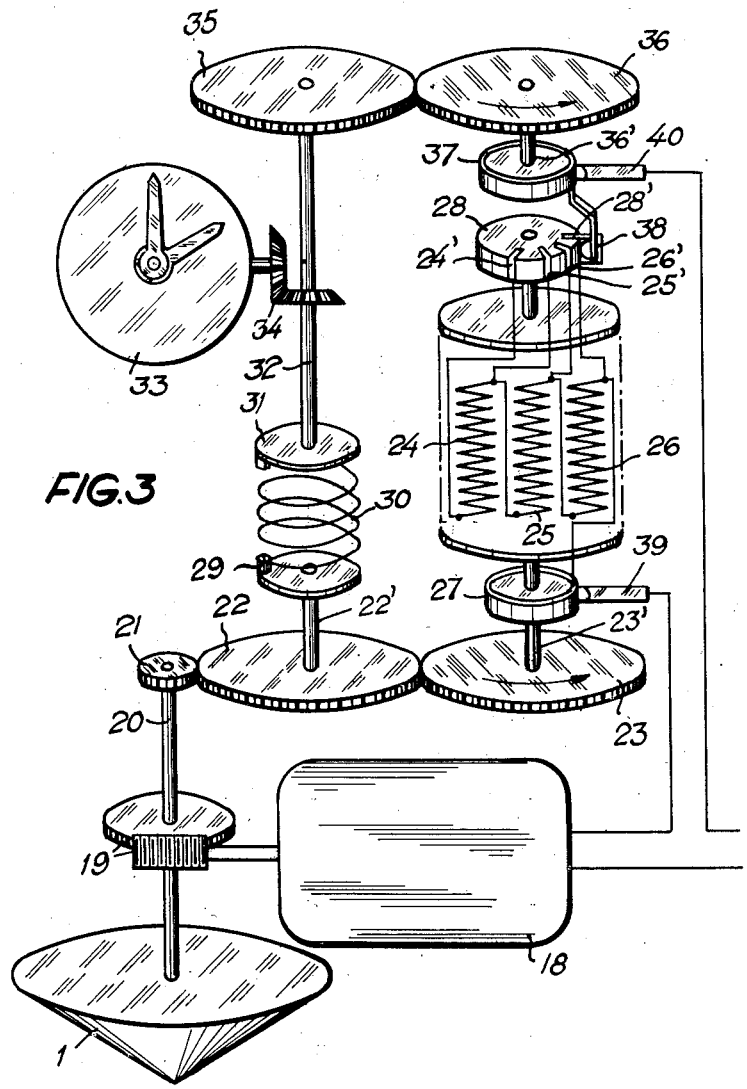

The invention will be elucidated more particularly by embodiments illustrated in the accompanying drawings. Figs. 1 and 2 are diagrammatic views of a device comprising an integrator, a counting apparatus and distance or remote transmission means according to the prior construction and that of the invention respectively. Fig. 3 is a diagrammatic view of the driving means for the friction cone of the integrator together with the control mechanism.

In Fig. 1 a cone appertaining to an integrator is designated by 1, said cone being driven at a constant speed, whereas 2 designates a wheel rolling on the cone and journalled in a bearing member 3, the position of which is determined by a rotary screw 4. The rotation of the screw 4 from a certain initial position, in which the bearing member 3 is located at the apex of the cone, is proportionate to the speed to be measured. The wheel 2 drives an axially displaceable coupling 5 comprising an outgoing shaft and a fork connected by a universal joint. The fork drives a bevel gear 6, coupled to a distance transmission device 10, for example, of electric type by three toothed gears 7, 8 and 9. The covered distance may be transmitted by this transmission device to any number of points in the ship. Mounted on the shaft of the gear wheel 8 is a bevel gear wheel 11 which meshes with a further bevel gear wheel 12 which drives a counting apparatus 13 submitting the covered distance.

In Fig. 2, 1, 2, 3 and 4 designate similar elements as in Fig. 1, and it is to be noted that the disc or cone 1 of the integrator may be driven by a motor arranged as the motor 18 hereinafter referred to in connection with Fig. 3. 14 denotes a toothed wheel journalled on the prolongation of the outgoing shaft of the integrator comprising the wheel 2. The rotation of wheel 2 is transferred to the toothed wheel 14 by a shaft 15 axially displaceable in the toothed wheel 14. Said shaft 15 may be provided with splines or may have any non-circular form. The toothed wheel 14 cooperates with another toothed wheel 16 which drives a counting apparatus 13 and a toothed wheel 17 having a distance or remote transmission device or giver 10 mounted on the shaft thereof. The spur gears comprising the toothed wheels 14, 16 and 17 have said wheels mounted directly on their shafts, the wheel 14 being axially displaceable on its shaft.

It is clear from the drawing that the embodiment shown in Fig. 2 involves an essential simplification as compared with the embodiment shown in Fig. 1 since the bevel gears 6 and 11, 12 included in the former case have been entirely omitted in the latter case.

The completion of the device shown in Fig. 2 as illustrated in Fig. 3 has for its object to further simplify the structure of the log. In Fig. 3, 18 designates an electric motor, the speed of which may be controlled by resistances included in one of its feeding circuits. The shaft of the motor is coupled to the integrator shaft 20 by way of a worm gear 19. Mounted on the shaft 20 is a toothed wheel 21 driving a second toothed wheel 22 which in turn drives a toothed wheel 23, the gears 19, 21, 22, 23 thus coupling the shaft 23' of wheel 23 to the motor 18. A number of resistances, for example three resistors 24, 25 and 26 are mounted on the shaft 23' of the toothed wheel 23, said resistances being electrically connected with the motor to determine its speed. In addition there are a slip ring 27 and a contact disc 28 mounted on the same shaft 23'. The contact disc 28 has one contact more than the number of resistors on the shaft, i. e. in the present case four contacts. One of these contacts 24', 25', 26', 28', i. e. the contact 28' is coupled directly to the slip ring 27 and the remainder of the contacts is coupled to this slip ring by different ohmic resistances by the three resistors 24, 25, 26 being connected in series, each point of connection and the free end or terminal being connected each to its contact.

Naturally, it is also possible to connect one terminal of each resistor to the slip ring 27 and the free ends of the resistors each to its contact. In the latter case, however, the resistances must be designed for a greater power. The contact 28' of the contact disc 28 which is directly connected to the slip ring 27 is formed as a mechanical stopping member, for example by projecting outward beyond the periphery of the disc 28.

Mounted on the shaft 22' of the toothed wheel 22 is a spring attachment 29 having secured thereto a spring 30, the other end of which is secured to a spring attachment 31 mounted on a shaft 32 which is coaxial with the shaft 22' of the toothed wheel 22. An escapement 33 is coupled to the shaft 32 by a gear transmission 34. Spring 30, shaft 32, gears 34 and escapement 33 form a clockwork. Spring 30 serves as the power spring for the clockwork and is strained continuously by motor 18 by way of the transmission 19, 20, 21, 22. The escapement 33 however permits only a constant speed of shaft 32, and as a result, a change of motor speed will result in a relative motion between contact 38 connected with shaft 36' and the contact disc 28. Mounted on the same shaft is further a toothed wheel 35 meshing with another toothed wheel 36, the shaft 36' of which is coaxial with the shaft 23' of the toothed wheel 23. Mounted on the shaft 36' of the toothed wheel 36 is a slip ring 37 and a contact arm 38 which engages the contact disc 28. Two brushes 39 and 40 engage the slip rings 27 and 37, respectively, and are coupled to the feeding circuit of the motor 18 in such a manner that the resistance between the brushes 39 and 40 determine the speed of rotation of the motor 18. Mounted on the shaft 20 is a for example conical friction disc 1 appertaining to an integrator which may also comprise a distance wheel 2 engaging the friction disc as shown in Fig. 2.

The motor is designed so as to rotate with a speed of rotation which corresponds to the outgoing speed of rotation of the escapement when a certain resistance is coupled between the brushes 39 and 40. This speed of rotation is here called the normal speed of rotation of the motor. If the resistance increases, the speed of rotation of the motor decreases and vice versa.

In the initial position the spring 30 is strained to some extent whereby the contact arm 38 engages the contact 28' formed as a stop on the contact disc 28. When the motor 18 is now connected to a source of current, it will start rotating at a speed which is greater than its normal speed. Thereby also the toothed wheels 22 and 23 will of course rotate at a speed somewhat too high. The contact arm 38 is then disengaged from the stop on the contact disc 28 and the spring 30 will be strained somewhat more. The escapement 33 will then get free to allow rotation of shaft 32. This shaft 32 must then rotate at its normal speed which is somewhat lower than the speed of rotation of the toothed wheel 22. As a result the spring 30 will be somewhat further strained, and in addition a displacement is obtained between the contact arm 38 and the disc 28. The contact arm 38 will now begin to engage the next contact on disc 28 whereby the speed of the motor 18 will be reduced. Should the speed still be too high, the contact arm 38 will move to engage next contact, whereby the speed of the motor 18 will be further reduced.

At a suitable design of the resistors 24 and 25, the contact arm 38 will alternately engage the second and the third contact of disc 28. As a result, there is a possibility of adapting the speed in extreme cases, for example if the working voltage of the motor would be too high. The contacts of disc 28 and contact arm 38 should of course be so broad relatively to the space between the contacts that no interruption is caused in the electric circuit. By this device or arrangement the motor 18 and in consequence also the friction disc 1 will run at a speed, which is entirely determined by the escapement 33 and thus is very constant.

The device according to Fig. 3 can be modified so that the contact arm 38 is driven by the motor, whereas the resistors 24—26 and their contacts 24', 25', 26', 28' are mounted on the shaft 36' operated by the escapement 33.

What is claimed is:

A power drive for rotating the constant speed input element of an integrator for logs, said drive comprising an electric motor having a shaft adapted to be coupled to said input element, a second shaft, a gear transmission coupling the motor shaft to the second shaft, a set of resistors mounted on the second shaft and connected in series with one another, a contact disc mounted on the second shaft and comprising contacts each electrically connected to a point of connection between the resistors and to the terminals of the resistor set, a third shaft, a contact arm mounted on the third shaft and adapted to engage the contact disc, means to connect one terminal of the resistor set with the motor, a fourth shaft driven by the motor, a spring connected to said fourth shaft, a fifth shaft connected to said spring, and an escapement for controlling the speed of the fifth shaft and thereby the third shaft to set the contact arm into engagement with one or another of said contacts for coupling one or more of the resistors to the motor to adjust the speed thereof.

EDVIN MAURITZ ÖSTERMAN.

REFERENCES CITED

The following references are of record in the file of this patent:

UNITED STATES PATENTS

| Number | Name | Date |
|---|---|---|
| 1,064,747 | Ledoux | June 17, 1913 |
| 1,506,765 | Merrill | Sept. 2, 1924 |
| 1,521,824 | Merrill | Jan. 6, 1925 |
| 1,968,539 | Rydberg | July 31, 1934 |
| 2,133,133 | Davis | Oct. 11, 1938 |

FOREIGN PATENTS

| Number | Country | Date |
|---|---|---|
| 9,223 | Great Britain | of 1909 |
| 182,586 | Great Britain | July 13, 1922 |